United States Patent
Griffith

(10) Patent No.: US 11,216,804 B2
(45) Date of Patent: Jan. 4, 2022

(54) CENTRAL REGISTRY SYSTEM FOR CRYPTOCURRENCIES

(71) Applicant: Nicholas B. Griffith, Birmingham, AL (US)

(72) Inventor: Nicholas B. Griffith, Birmingham, AL (US)

( * ) Notice: Subject to any disclaimer, the term of this patent is extended or adjusted under 35 U.S.C. 154(b) by 121 days.

(21) Appl. No.: 16/291,203

(22) Filed: Mar. 4, 2019

(65) Prior Publication Data

US 2019/0272534 A1 Sep. 5, 2019

Related U.S. Application Data

(60) Provisional application No. 62/637,978, filed on Mar. 2, 2018.

(51) Int. Cl.
| | |
|---|---|
| *G06Q 20/36* | (2012.01) |
| *G06Q 20/38* | (2012.01) |
| *G06Q 20/06* | (2012.01) |
| *G06Q 20/14* | (2012.01) |

(52) U.S. Cl.
CPC ..... *G06Q 20/3678* (2013.01); *G06Q 20/0658* (2013.01); *G06Q 20/3829* (2013.01); *G06Q 20/145* (2013.01); *G06Q 2220/00* (2013.01)

(58) Field of Classification Search
CPC ........... G06Q 20/3678; G06Q 20/0658; G06Q 20/3829; G06Q 2220/00
See application file for complete search history.

(56) References Cited

U.S. PATENT DOCUMENTS

| | | | | |
|---|---|---|---|---|
| 10,055,926 B2* | 8/2018 | Campero | .............. | H04L 9/0825 |
| 10,068,228 B1* | 9/2018 | Winklevoss | ........ | G06Q 20/3829 |
| 10,147,076 B2* | 12/2018 | Zhou | .................... | G06Q 20/351 |
| 10,229,396 B2* | 3/2019 | Shtylman | ............. | G06Q 20/382 |
| 10,644,879 B2* | 5/2020 | Alness | ................. | H04L 9/0819 |
| 10,789,589 B2* | 9/2020 | Nuzzi | .................. | G06Q 20/389 |
| 2002/0004783 A1* | 1/2002 | Paltenghe | ............. | G06Q 30/06 |
| | | | | 705/41 |
| 2002/0062249 A1* | 5/2002 | Iannacci | ............. | G06Q 20/105 |
| | | | | 705/14.1 |

(Continued)

OTHER PUBLICATIONS

Satoshi Nakamoto, "Bitcoin: A Peer-to-Peer Electronic Cash System," Oct. 31, 2008 [retrieved Nov. 17, 2020], available at https://bitcoin.org/bitcoin.pdf, 9 pages. (Year: 2008).*

(Continued)

*Primary Examiner* — Jacob C. Coppola
*Assistant Examiner* — Timothy Paul Sax
(74) *Attorney, Agent, or Firm* — Wayne Edward Ramage; Baker Donelson

(57) ABSTRACT

A system and related methods for providing and operating a central registry for cryptocurrencies. A central registry communicates with user cryptocurrency wallet applications through standard protocols, thereby allowing users to easily look up wallet addresses from input in a human-readable format. A user registers a wallet address name with the registry. The user then configures the registered wallet address name to be associated with one or more cryptocurrency wallet addresses. Once configured, the user can then provide or share the registered wallet address name with other users or services.

12 Claims, 1 Drawing Sheet

(56) References Cited

U.S. PATENT DOCUMENTS

| | | | | |
|---|---|---|---|---|
| 2014/0258121 | A1* | 9/2014 | Raman | G06Q 20/322 |
| | | | | 705/44 |
| 2015/0120569 | A1* | 4/2015 | Belshe | G06Q 20/065 |
| | | | | 705/71 |
| 2015/0287026 | A1* | 10/2015 | Yang | G06Q 20/06 |
| | | | | 705/69 |
| 2015/0332283 | A1* | 11/2015 | Witchey | H04W 12/02 |
| | | | | 705/3 |
| 2015/0363769 | A1* | 12/2015 | Ronca | G06Q 40/04 |
| | | | | 705/64 |
| 2015/0365283 | A1* | 12/2015 | Ronca | H04L 67/12 |
| | | | | 705/71 |
| 2016/0203448 | A1* | 7/2016 | Metnick | H04L 9/3247 |
| | | | | 705/64 |
| 2016/0203477 | A1* | 7/2016 | Yang | G06Q 20/3678 |
| | | | | 705/69 |
| 2016/0260091 | A1* | 9/2016 | Tobias | G06Q 20/3678 |
| 2016/0261411 | A1 | 9/2016 | Yau et al. | |
| 2016/0267605 | A1* | 9/2016 | Lingham | G06Q 40/12 |
| 2016/0292672 | A1* | 10/2016 | Fay | G06Q 20/36 |
| 2017/0031874 | A1* | 2/2017 | Boudville | H04L 9/3239 |
| 2017/0048235 | A1 | 2/2017 | Lohe et al. | |
| 2017/0053249 | A1* | 2/2017 | Tunnell | G06Q 20/065 |
| 2017/0068952 | A1* | 3/2017 | Brockmann | G06Q 20/3672 |
| 2017/0124535 | A1* | 5/2017 | Juels | G06Q 20/0655 |
| 2017/0132630 | A1* | 5/2017 | Castinado | G06Q 20/382 |
| 2017/0221052 | A1 | 8/2017 | Sheng et al. | |
| 2017/0228822 | A1* | 8/2017 | Creighton, IV | G06Q 20/3829 |
| 2017/0230189 | A1* | 8/2017 | Toll | H04L 9/3247 |
| 2017/0236118 | A1* | 8/2017 | Laracey | G06Q 20/3674 |
| | | | | 705/44 |
| 2017/0295157 | A1* | 10/2017 | Chavez | H04L 63/08 |
| 2017/0346833 | A1* | 11/2017 | Zhang | H04L 63/123 |
| 2018/0053182 | A1* | 2/2018 | Mokhasi | H04L 63/126 |
| 2018/0191503 | A1* | 7/2018 | Alwar | H04L 9/0637 |
| 2018/0240107 | A1* | 8/2018 | Andrade | G06Q 20/36 |
| 2019/0251552 | A1* | 8/2019 | Kurian | H04L 63/0861 |
| 2020/0258152 | A1* | 8/2020 | Naggar | G06Q 40/04 |

OTHER PUBLICATIONS

Shayan Eskandari, et al., "A First Look at the Usability of Bitcoin Key Management," USEC '15, Feb. 8, 2015, San Diego, CA, USA, Internet Society, ISBN 1-89156, available at https://arxiv.org/pdf/1802.04351.pdf, 10 pages. (Year: 2015).*

"Top Seven Ways Your Identity Can Be Linked to Your Bitcoin Address," 99Bitcoins.com, archived Nov. 24, 2017 at http://web.archive.org/web/20171124142538/https://99bitcoins.com/know-more-top-seven-ways-your-identity-can-be-linked-to-your-bitcoin-address/, 9 pages. (Year: 2017).*

Ameer Rosie, "Blockchain Address 101: What Are Addresses on Blockchains?," Blockgeeks.com, archived Jul. 24, 2017, at https://web.archive.org/web/20170724153452/https://blockgeeks.com/guides/blockchain-address-101/, 12 pages. (Year: 2017).*

"STEEM Bluepaper,"steem.com, (2017), archived on Mar. 21, 2019, at https://web.archive.org/web/20190321133643/https://steem.com/steem-bluepaper.pdf, 7 pages. (Year: 2017).*

"STEEM Whitepaper," steem.com, Aug. 2017, archived on Nov. 7, 2018, at https://web.archive.org/web/20181107045258/https://steem.com/SteemWhitePaper.pdf, 32 pages. (Year: 2017).*

SatoshiLabs, "Wallet, Accounts and Addresses", May 18, 2017 (Year: 2017).*

Unocoin, "NETKI—A Personalized memorable Wallet Name For Your Bitcoin Address", Apr. 7, 2016 (Year: 2016).*

International Search Report and Written Opinion, PCT/US19/20489, Griffith (international filing date Mar. 4, 2019).

* cited by examiner

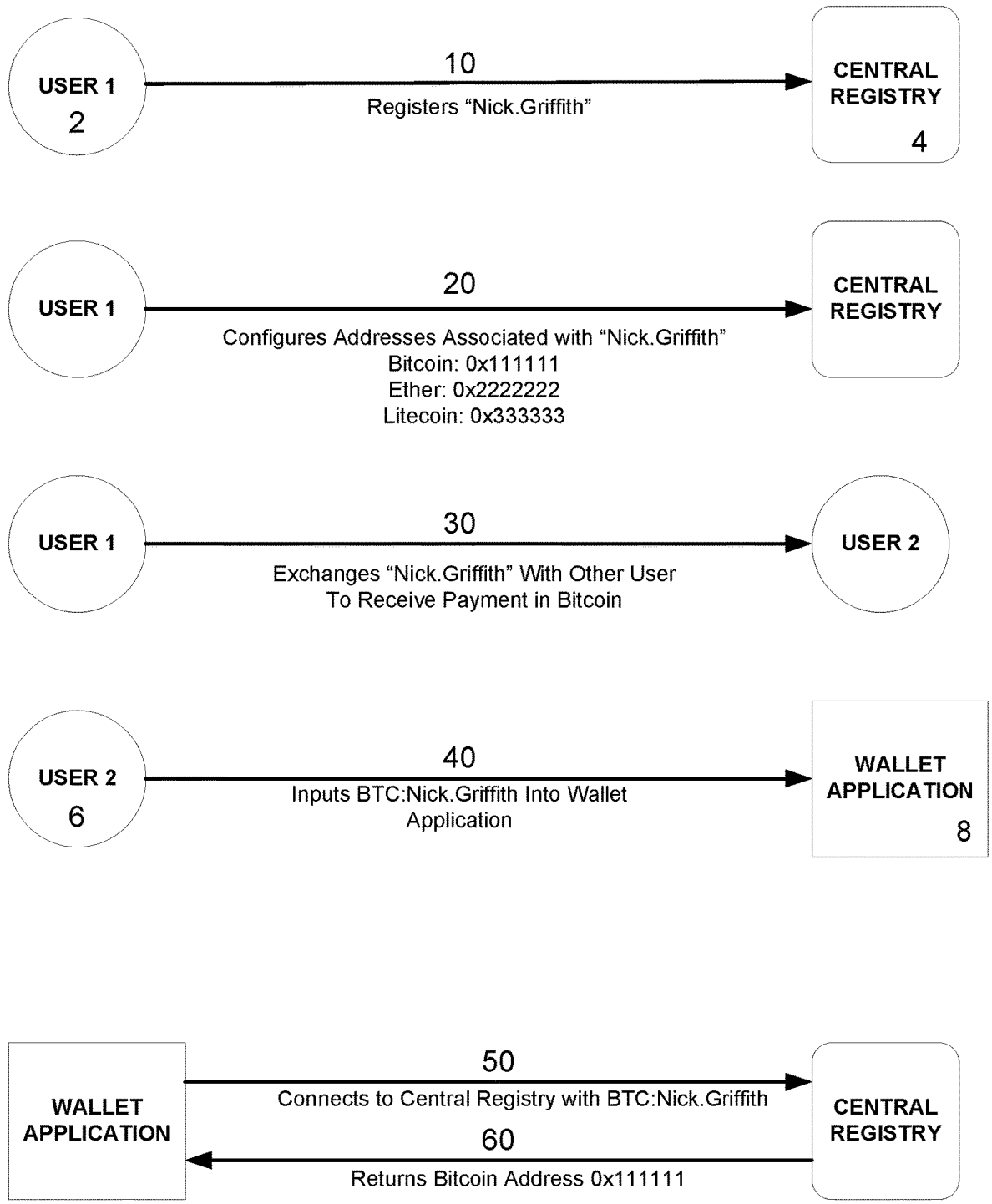

CENTRAL REGISTRY SYSTEM FOR CRYPTOCURRENCIES

This application claims benefit of and priority to U.S. Provisional App. No. 62/637,978, filed Mar. 2, 2018, which is incorporated herein in its entirety by specific reference for all purposes.

FIELD OF INVENTION

This invention relates to a system and related methods for providing and operating a central registry for cryptocurrencies.

BACKGROUND OF INVENTION

In general, current cryptocurrency systems are carried out used a blockchain-based distributed database system. A blockchain consists of a series of blocks which are generated with and protected by a cryptographic method. Each block contains a hash value of a previous block, so the blockchain is formed through connections from an originating block through a series of blocks to the current block. The system ensures that each block is generated after a previous block in chronological order.

Blockchain-based systems originated with digital currency implementations, particularly Bitcoin, which was initially described in the whitepaper "Bitcoin: A Peer-to-Peer Electronic Cash System," authored under the pseudonym Satoshi Nakamoto, dated Oct. 31, 2008 (a copy of which is attached to U.S. Provisional App. No. 62/637,978 as an appendix, and is incorporated herein by specific reference for all purposes). Since that time, blockchain-based systems have been described for use in other contexts, such as healthcare IT, securities transactions, and gift cards. Examples of such systems are disclosed in the following published patent applications, all of which are incorporated herein in their entireties by specific reference for all purposes:

Zhang, et al., "Blockchain-Based System, and Electronic Apparatus and Method in the System," U.S. application Ser. No. 15/450,126, US Pub. 2017/0346833 (Nov. 30, 2017).

Chavez, et al., "Smartphone Fraud-Proof Authorization and Authentication For Secure Interactions," U.S. application Ser. No. 15/284,103, US Pub. 2017/0295157 (Oct. 12, 2017).

Creighton, et al., "Blockchain Technology to Settle Transactions," U.S. application Ser. No. 15/467,727, US Pub. 2017/0228822 (Aug. 10, 2017).

Toll, et al., "Systems and Methods for Storing and Sharing Transactional Data Using a Distributed Computing Systems," U.S. application Ser. No. 15/423,668, US Pub. 2017/0230189, (Aug. 10, 2017).

Boudville, "Blockchain and Deep Links for Mobile Apps," U.S. application Ser. No. 14/756,058, US Pub. 2017/0031874 (Feb. 2, 2017).

Fay, et al., "Systems and Methods of Blockchain Transaction Recordation," U.S. application Ser. No. 15/086,801, US Pub. 2016/0292672 (Oct. 6, 2016).

Lingham, et al., "System and Method for Establishing a Public Ledger for Gift Card Transactions," U.S. application Ser. No. 14/658,097, US Pub. 2016/0267605 (Sep. 15, 2016).

Witchey, "Healthcare Transaction Validation via Blockchain Proof-of-Work, Systems and Methods," U.S. application Ser. No. 14/711,740, US Pub. 2015/0332283 (Nov. 19, 2015).

SUMMARY OF INVENTION

In various exemplary embodiments, the present invention comprises a system and related methods for providing and operating a central registry for cryptocurrencies. A central registry communicates with user cryptocurrency wallet applications through standard protocols, thereby allowing users to easily look up wallet addresses from input in a human-readable format. A user registers a wallet address name with the registry. The user then configures the registered wallet address name to be associated with one or more cryptocurrency wallet addresses. Once configured, the user can then provide or share the registered wallet address name with other users or services.

BRIEF DESCRIPTION OF THE DRAWINGS

FIG. 1 illustrates an exemplary embodiment of the present invention.

DETAILED DESCRIPTION OF EXEMPLARY EMBODIMENTS

In various exemplary embodiments, the present invention comprises a system and related methods for providing and operating a central registry for cryptocurrencies. In several embodiments, the present invention provides a mechanism and protocol allowing users to easily exchange cryptocurrency wallet addresses in a human-readable format.

In one embodiment, as seen in FIG. 1, a central registry 4 communicates with user cryptocurrency wallet applications through standard protocols, thereby allowing users 2 to easily look up wallet addresses from input in a human-readable format. For example, a user 2 registers a wallet address name (e.g., "Nick.Griffith") 10 with the registry 4. The user 2 then configures the registered address name to be associated with one or more cryptocurrency wallets (e.g., Bitcoin address 0x11111111, Ether address 0x2222222, Litecoin address 0x333333333) 20. Once configured, the user 2 can then provide or share the registered address with other users 6 or services.

In a subsequent transaction, a second user 6 may desire to send a certain amount of cryptocurrency coins to the first user 2. The first user 2 provides the address name Nick.Griffith 30 to the second user 6. The second user 6 opens the applicable wallet application 8 and enters the address name Nick.Griffith 40, and the amount and type of coins to be transferred. The wallet application 8 then transmits the address name 50 to the central registry 4, which attempts to look up the addresses for the corresponding coin type. If found, the corresponding coin address is sent back 60 to the appropriate user wallets, and the transaction is completed. If not found, or the address is otherwise invalid, the registry sends an error or "not-found" message to the appropriate user wallets (at which point, the second user wallet application stops the transaction and does not transfer coins).

The present invention thus solves a current technological problem with cryptocurrency transfers, where a typographical error in entering a long address can cause the transaction to fail, or even worse, cause cryptocurrency coins to be sent to unintended addresses, including addresses that no one has control of (which causes currency to be lost without the ability to be recovered).

Examples of HTTP Protocol Requests and Responses are as follows:

```
(A)
Request
http://registry.com/btc/nick.griffith
Response:
{
    currency:"Bitcoin"
    address:" 0x11111111"
}
(B)
Request
http://registry.com/mnr/nick/griffith
Response:
{
    currency:"Monero"
    error:"Address not configured with Monero"
}
(C)
HTTPS:
https://registry.com/btc/example.company
Response After Decryption:
{
    currency:"Bitcoin"
    address:" 0x11111111"
}
(D)
DNS Lookup Protocol and Format:
UDP Request To registry.com, Response After Decryption
;; QUESTION SECTION:
;example.company        IN BTC
;; ANSWER SECTION:
example.company      59 IN BTC 0x11111111
```

In several embodiments, a user registers a user account with the central registry (through the central registry website, mobile application, or similar means). User accounts are secured by various means known in the art, such as two-factor authentication and/or an optional external hardware key that stores a private key used for authentication.

Once a user account is registered, the user may search for one or more wallet address names to register and claim to the user account. Wallet address names may only be registered or claimed by a single user account, which is considered the owner of the wallet address name. Wallet address name ownership can be transferred to another user account through a secure, multi-step transfer process, where the wallet address name being transferred may be reconfigured by the new owning user account.

In one embodiment, ownership of a wallet address name is stored in two pieces. Ownership is stored in a custom "wallet name chain" using block chain technology. When a user account is created, it is given a private key for the wallet name chain. All registrations and transfer of a wallet address name are added to the wallet name chain to securely store ownership and prevent unauthorized registrations and transfers. Transfers and registrations will require signing by multiple private keys in order to be added to the wallet name chain.

A wallet address name can be configured to accept or be associated with many different cryptocurrencies. To configure a wallet address name, the user selects which supported cryptocurrency he or she would like to accept and enter in one or multiple cryptocurrency wallet addresses. If there is a single cryptocurrency wallet address for a particular cryptocurrency, then generally any cryptocurrency of that type received or transferred is directed to that cryptocurrency wallet address. If multiple cryptocurrency wallet addresses are configured for a particular cryptocurrency, the user account can configure how cryptocurrency will be registered. For example, configuration options may include the following:

1. Even or Random Split: This option will return all or a subset (in sequence or randomly) of appropriate cryptocurrency wallet addresses to distribute currency transfers among many different cryptocurrency wallet addresses.

2. Key Based: This option associates metadata keys with specific cryptocurrency wallet address, e.g., "checking" associated with cryptocurrency wallet address A and "savings" associated with cryptocurrency wallet address B. If an API client requests "checking," cryptocurrency wallet address A is returned and the currency transfer is directed to that wallet address.

3. One Time Use: This option creates a new cryptocurrency wallet address for every request to a specific wallet address name. In some cases, this new address is created regardless of the existence of other addresses with the same cryptocurrency type. This requires the wallet private key to be stored by the system.

API developers can register a particular wallet application with the central registry (e.g., through the central registry website). API developers seeking to register an application are verified through a strict verification process to prevent fraudulent developers attempting to improperly access cryptocurrency wallet addresses. Once a wallet application is registered, the developer will be required to upload an API Developer public key (which has a corresponding private key paired with this public key) and download the registry system's public key. All requests to the system using the developer application must be encrypted by the downloaded registry system public key and the developer's private key. Responses back will be returned encrypted with the registry system's private key (which is paired with the downloaded registry system's public key) and the public key that was uploaded by the developer. This assures that the response cannot be tampered with and protects from "man in the middle" attacks that can modify the cryptocurrency wallet address that is returned by the system.

With configured addresses, the system will return error messages if the wallet address name does not exist or is not what is expected. It can also return an error if the cryptocurrency wallet addresses is not configured. This can prevent the transfer of cryptocurrency to cryptocurrency wallet addresses that are not controlled by the intended party.

User accounts can allow certain data to be exposed on API Response (e.g., Name or Verification) so that the wallet application developers can display this information to the user of the wallet before a transfer takes place. This can be used by the user to verify that they are sending cryptocurrency to the correct (expected) owner of the cryptocurrency wallet address. Online stores or other vendors may use this mechanism to display something (such as a name or code) to the user through the wallet developer application before a purchase takes place so that the user is confident that he or she is paying correctly.

In order to provide a context for the various computer-implemented aspects of the invention, the following discussion provides a brief, general description of a suitable computing environment in which the various aspects of the present invention may be implemented. A computing system environment is one example of a suitable computing environment, but is not intended to suggest any limitation as to the scope of use or functionality of the invention. A computing environment may contain any one or combination of components discussed below, and may contain additional components, or some of the illustrated components may be absent. Various embodiments of the invention are operational with numerous general purpose or special purpose computing systems, environments or configurations. Examples of computing systems, environments, or configurations that may be suitable for use with various embodiments of the invention include, but are not limited to, personal computers, laptop computers, computer servers, computer notebooks, hand-held devices, microprocessor-based systems, multiprocessor systems, TV set-top boxes and devices, programmable consumer electronics, cell phones, personal digital assistants (PDAs), tablets, smart phones, touch screen devices, smart TV, internet enabled appliances, internet enabled security systems, internet enabled gaming systems, internet enabled watches; internet enabled cars (or transportation), network PCs, minicomputers, mainframe computers, embedded systems, virtual systems, distributed computing environments, streaming environments, volatile environments, and the like.

Embodiments of the invention may be implemented in the form of computer-executable instructions, such as program code or program modules, being executed by a computer, virtual computer, or computing device. Program code or modules may include programs, objects, components, data elements and structures, routines, subroutines, functions, and the like. These are used to perform or implement particular tasks or functions. Embodiments of the invention also may be implemented in distributed computing environments. In such environments, tasks are performed by remote processing devices linked via a communications network or other data transmission medium, and data and program code or modules may be located in both local and remote computer storage media including memory storage devices such as, but not limited to, hard drives, solid state drives (SSD), flash drives, USB drives, optical drives, and internet-based storage (e.g., "cloud" storage).

In one embodiment, a computer system comprises multiple client devices in communication with one or more server devices through or over a network, although in some cases no server device is used. In various embodiments, the network may comprise the Internet, an intranet, Wide Area Network (WAN), or Local Area Network (LAN). It should be noted that many of the methods of the present invention are operable within a single computing device.

A client device may be any type of processor-based platform that is connected to a network and that interacts with one or more application programs. The client devices each comprise a computer-readable medium in the form of volatile and/or nonvolatile memory such as read only memory (ROM) and random access memory (RAM) in communication with a processor. The processor executes computer-executable program instructions stored in memory. Examples of such processors include, but are not limited to, microprocessors, ASICs, and the like.

Client devices may further comprise computer-readable media in communication with the processor, said media storing program code, modules and instructions that, when executed by the processor, cause the processor to execute the program and perform the steps described herein. Computer readable media can be any available media that can be accessed by computer or computing device and includes both volatile and nonvolatile media, and removable and non-removable media. Computer-readable media may further comprise computer storage media and communication media. Computer storage media comprises media for storage of information, such as computer readable instructions, data, data structures, or program code or modules. Examples of computer-readable media include, but are not limited to, any electronic, optical, magnetic, or other storage or transmission device, a floppy disk, hard disk drive, CD-ROM, DVD, magnetic disk, memory chip, ROM, RAM, EEPROM, flash memory or other memory technology, an ASIC, a configured processor, CDROM, DVD or other optical disk storage, magnetic cassettes, magnetic tape, magnetic disk storage or other magnetic storage devices, or any other medium from which a computer processor can read instructions or that can store desired information. Communication media comprises media that may transmit or carry instructions to a computer, including, but not limited to, a router, private or public network, wired network, direct wired connection, wireless network, other wireless media (such as acoustic, RF, infrared, or the like), or other transmission device or channel. This may include computer readable instructions, data structures, program modules or other data in a modulated data signal such as a carrier wave or other transport mechanism. Said transmission may be wired, wireless, or both. Combinations of any of the above should also be included within the scope of computer readable media. The instructions may comprise code from any computer-programming language, including, for example, C, C++, C#, Visual Basic, Java, and the like.

Components of a general purpose client or computing device may further include a system bus that connects various system components, including the memory and processor. A system bus may be any of several types of bus structures, including, but not limited to, a memory bus or memory controller, a peripheral bus, and a local bus using any of a variety of bus architectures. Such architectures include, but are not limited to, Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing and client devices also may include a basic input/output system (BIOS), which contains the basic routines that help to transfer information between elements within a computer, such as during start-up. BIOS typically is stored in ROM. In contrast, RAM typically contains data or program code or modules that are accessible to or presently being operated on by processor, such as, but not limited to, the operating system, application program, and data.

Client devices also may comprise a variety of other internal or external components, such as a monitor or display, a keyboard, a mouse, a trackball, a pointing device, touch pad, microphone, joystick, satellite dish, scanner, a disk drive, a CD-ROM or DVD drive, or other input or output devices. These and other devices are typically connected to the processor through a user input interface coupled to the system bus, but may be connected by other interface and bus structures, such as a parallel port, serial port, game port or a universal serial bus (USB). A monitor or other type of display device is typically connected to the system bus via a video interface. In addition to the monitor, client devices may also include other peripheral output devices such as speakers and printer, which may be connected through an output peripheral interface.

Client devices may operate on any operating system capable of supporting an application of the type disclosed herein. Client devices also may support a browser or browser-enabled application. Examples of client devices include, but are not limited to, personal computers, laptop computers, personal digital assistants, computer notebooks, hand-held devices, cellular phones, mobile phones, smart phones, pagers, digital tablets, Internet appliances, and other processor-based devices. Users may communicate with each other, and with other systems, networks, and devices, over the network through the respective client devices.

As used herein, the singular forms "a," "an" and "the" include plural referents unless the context clearly dictates otherwise. Further, the terms "additional", "optional", "optionally", "may" and the like mean that the subsequently described operation, event or functionality mayor may not be required, and that the description includes instances where said operation, event or functionality occurs and instances where it does not. The word "comprise" and variations of that word, and the word "include" and variations of that word, mean "including but not limited to," and are not intended to exclude, for example, other components, steps, or operations. "For example" and "exemplary" mean "an example of" and are not intended to convey an ideal embodiment.

Thus, it should be understood that the embodiments and examples described herein have been chosen and described in order to best illustrate the principles of the invention and its practical applications to thereby enable one of ordinary skill in the art to best utilize the invention in various embodiments and with various modifications as are suited for particular uses contemplated. The system, methods and apparatus of the present invention are not limited to specific components, network connections, or arrangements described and disclosed herein, as such may vary. It is also to be understood that the terminology used herein is for the purpose of describing particular embodiments only, and is not intended to be limiting. Even though specific embodiments of this invention have been described, they are not to be taken as exhaustive. There are several variations that will be apparent to those skilled in the art.

What is claimed is:

1. A system for securing electronic cryptocurrency transfers, comprising:
    a central registry with at least one server with a microprocessor and at least one database storing a plurality of registered wallet address names, each registered wallet address name associated with a user;
    wherein each registered wallet address name is associated with at least one cryptocurrency wallet address, each cryptocurrency wallet address associated with a particular type of cryptocurrency and comprising the digital location of a digital cryptocurrency wallet on a network, said cryptocurrency wallet storing public keys and/or private keys for cryptocurrency transactions;
    wherein the microprocessor is programmed to:
        receive, over an electronic network, from a user wallet application running on a user mobile device, a cryptocurrency wallet identification request, the identification request comprising a wallet address name and a cryptocurrency type;
        determine whether the wallet address name is a valid registered wallet address name;
        if the wallet address name is a valid registered wallet address name, determine if at least one cryptocurrency wallet address of the cryptocurrency type in the identification request is associated with the valid registered wallet address name; and
        if at least one cryptocurrency wallet address of the cryptocurrency type in the identification request is associated with the valid registered wallet address name, transmit over the electronic network the at least one cryptocurrency wallet address to the user wallet application, otherwise transmit over the electronic network an error message to the user wallet application indicating that no cryptocurrency wallet address of the cryptocurrency type in the identification request is associated with the valid registered wallet address name;
    wherein cryptocurrency transactions over the electronic network are completed by a first participant in the cryptocurrency transaction providing a registered wallet address name to a second participant without providing the cryptocurrency wallet address.

2. The system of claim 1, wherein the microprocessor is further programmed to:
    if the wallet address name in the identification request is not a valid registered wallet address name, transmit an error message to the user wallet application.

3. The system of claim 1, wherein the microprocessor is further programmed to:
    receive a request from a developer to register a cryptocurrency wallet application;
    after verifying the developer, register the cryptocurrency wallet application;
    receive and store a public key from the developer for the cryptocurrency wallet application; and
    provide a central registry public key to the developer.

4. The system of claim 3, wherein the user wallet application is a registered cryptocurrency wallet application.

5. The system of claim 1, wherein ownership information regarding each registered wallet address name is stored in a wallet name chain.

6. The system of claim 1, wherein each registered wallet address name is configured to accept multiple types of cryptocurrencies.

7. The system of claim 1, wherein each registered wallet address name is associated with two or more cryptocurrency wallet addresses.

8. The system of claim 7, wherein at least two of said two or more cryptocurrency wallet addresses have the same cryptocurrency type.

9. The system of claim 8, wherein
    if there are two or more cryptocurrency wallet addresses of the cryptocurrency type in the identification request associated with the valid registered wallet address name, transmit at least some of the two or more cryptocurrency wallet addresses to the user wallet application.

10. The system of claim 9, wherein all of the two or more cryptocurrency wallet addresses are transmitted to the user wallet applications.

11. The system of claim 8, further wherein one or more of said cryptocurrency wallet addresses comprise an associated metadata key.

12. The system of claim 8, the two or more said cryptocurrency wallet addresses transmitted to the user wallet application comprising a specified associated metadata key, wherein the specified associated metadata key is included in the identification request.

* * * * *